United States Patent [19]

Hey

[11] Patent Number: 5,762,449
[45] Date of Patent: Jun. 9, 1998

[54] RIVER OR LAKE BOTTOM APPARATUS FOR SCAVENGER FISH CONTROL

[76] Inventor: Donald L. Hey, 53 W. Jackson Blvd., Chicago, Ill. 60604

[21] Appl. No.: 279,032

[22] Filed: Jul. 22, 1994

[51] Int. Cl.$^6$ ................................ E02B 3/00; E02B 8/08
[52] U.S. Cl. ............................... 405/81; 405/16; 405/17; 47/9; 47/56
[58] Field of Search ................................ 405/16, 17, 21, 405/29–35, 15, 258; 47/56, 58, 95

[56] References Cited

U.S. PATENT DOCUMENTS

| | | |
|---|---|---|
| 149,921 | 4/1874 | Cook. |
| 1,834,060 | 12/1931 | Hough ........................................ 405/17 |
| 3,017,857 | 1/1962 | Munz. |
| 3,127,692 | 4/1964 | Adleberg. |
| 3,252,251 | 5/1966 | Simmons ................................ 47/95 X |
| 3,315,408 | 4/1967 | Fisher ..................................... 47/56 X |
| 3,384,993 | 5/1968 | Kane ...................................... 47/95 X |
| 3,425,227 | 2/1969 | Hillen. |
| 3,592,792 | 7/1971 | Newland et al. ....................... 47/95 X |
| 3,830,066 | 8/1974 | Larsen. |
| 3,853,095 | 12/1974 | Lawrence. |
| 3,888,209 | 6/1975 | Boots. |
| 3,928,978 | 12/1975 | Larsen. |
| 4,056,936 | 11/1977 | Mayer .................................... 405/17 |
| 4,091,568 | 5/1978 | Zinter .................................... 47/56 X |
| 4,231,322 | 11/1980 | Gilpatric. |
| 4,518,280 | 5/1985 | Fletcher. |
| 4,916,855 | 4/1990 | Halliday et al. ...................... 47/56 X |
| 4,993,870 | 2/1991 | Bridgewater ......................... 405/21 |
| 5,358,356 | 10/1994 | Romanek et al. .................... 405/16 |

*Primary Examiner*—Dennis L. Taylor
*Attorney, Agent, or Firm*—Kevin T. Conroy

[57] ABSTRACT

A river bottom fish control apparatus, which includes a mesh grid netting for providing a substrate for plants and other benthic organism growth and for decreasing turbidity in a body of water. The mesh grid netting includes a flexible plastic having mesh openings and apertures forming flaps located at spaced intervals. The apertures are relatively larger than the mesh openings. The apertures may form crescent-shaped flaps having an apex end and a hinge end and may have a recessed portion removed from the apex end of the flaps or a thin strip removed contiguous to the length of the aperture.

19 Claims, 2 Drawing Sheets

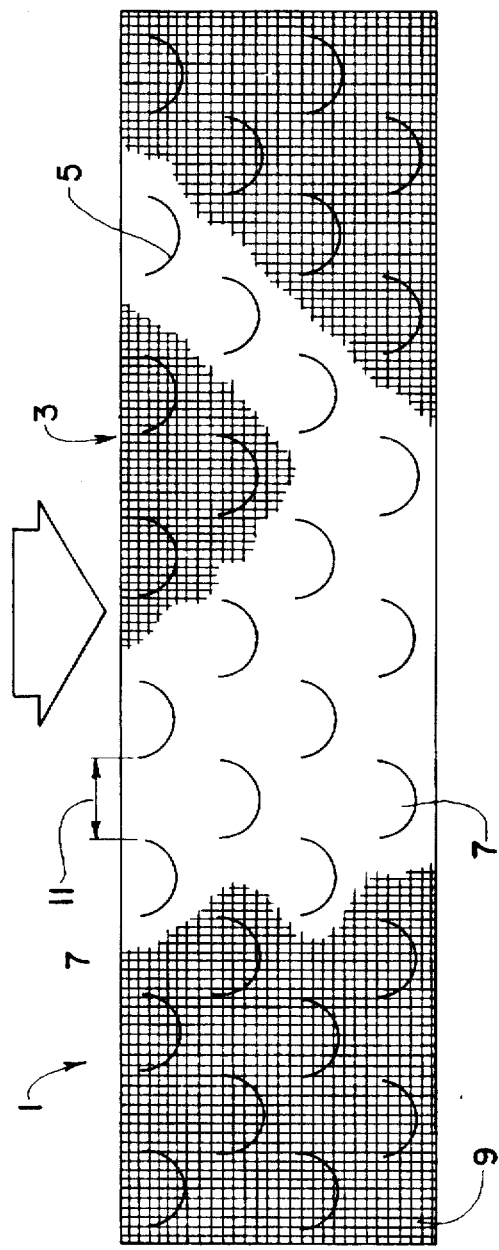
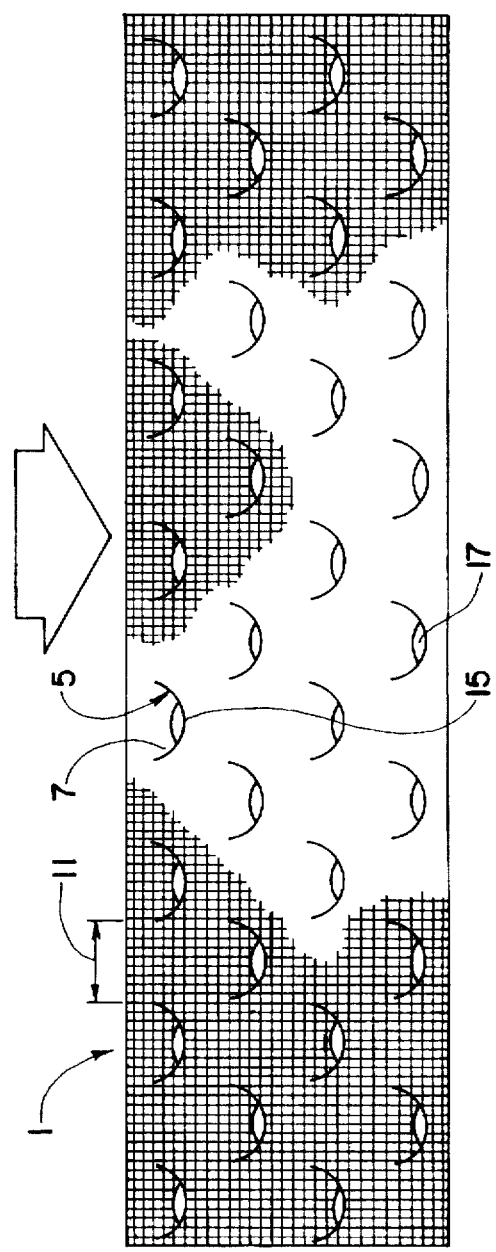

RIVER OR LAKE BOTTOM APPARATUS FOR SCAVENGER FISH CONTROL

BACKGROUND OF THE INVENTION

1. Field of the Invention

This invention relates to an apparatus for covering portions of a river or lake bottom. More particularly, this invention relates to a mesh netting for protecting a river bottom from the effects of sediment re-suspension caused by scavenging activities of certain fish.

2. Background of the Invention

The common carp and other scavenger fish have become ubiquitous in many rivers and streams. Their habits of "rooting" and benthic feeding often cause high turbidity levels, increased concentrations of suspended solids, destruction of emergent aquatic plants, as well as excessive competition with native fish species. Consequently, in many streams and rivers where carp are abundant, the water quality decreases as does the numerousness of native fish.

Carp densities are difficult to control. Efforts to control carp have been based primarily on removal and poisoning techniques, largely with ineffectual results. Carp quickly re-invade areas from which they have been removed, and many of the pesticides are not specific or effective enough to eliminate the carp while allowing to survive the native fish species. Thus, carp remain a detriment to the health of many rivers and streams.

Carp can be particularly damaging to aquatic plants. Disruption of the soft substrates on stream bottoms as a result of feeding by carp dislodges or harms many aquatic plants. Additionally, the increased turbidity, caused by the disruption of bottom substrates, decreases the ability of light to penetrate water, which reduces plant reproduction and propagule success. Consequently, the presence of carp are likely to decrease the success of attempts to re-establish aquatic plants in areas where the plants were once abundant.

One method of increasing the population of sports fish population in a river system entails increasing the benthic invertebrate food population by modifying the river's habitat through the provision of structure in the river substrate on which the benthic invertebrate can reproduce. River mesh netting provides a substrate which both protects the river bottom from rooting and additionally provides a substrate for benthic invertebrate reproduction.

Some methods exist that utilize nets lying on the bottoms of rivers and lakes. For instance, U.S. Pat. No. 149,921 teaches a net on a river bottom for improving oyster harvesting. The net acts as a barrier against mollusks or oysters beneath the net. However, the '921 patent teaches a method of periodically drawing up the net to capture and remove starfish which crawl up through meshes of the net and rest on top of the net. This removal method has several limitations, including the necessity of periodically drawing up the net and the fact that this method does not serve the purpose of increasing aquatic plant growth.

In addition, U.S. Pat. No. 3,830,066 teaches a method of protecting sand and other littoral drift material on the bottoms of seas, lakes, rivers and other bodies of water where the bottoms consist of erodible material such as sand or clay. However, that patent does not teach the use of meshing and rather shows a method of causing increased sedimentary deposits.

It is also known in the art to apply a polymer film having a plurality of incisions and a low light transmission quality to inhibit the growth of aquatic plants. Such a film is disclosed in U.S. Pat. No. 4,518,280. However, this invention achieves the opposite result of inhibiting plant growth, rather than encouraging it.

In summary, known river bottom coverings are constructed to achieve different results than to encourage aquatic plant growth. However, owing to the pervasive infestation of carp and the resulting homogenization of river bottoms, a substantial need exists for an apparatus which specifically provides a substrate for encouraging aquatic plant reproduction and growth and which decreases substrate disruption and sediment suspension. This may be achieved by effectuating a mesh netting which provides protection from invasive fish while allowing sufficient ingress and egress to the river bottom by aquatic plants and organisms, as well as by allowing sunlight to reach the river bottom.

OBJECTS OF THE INVENTION

One object of the invention is to protect the bottom of a body of water, such as a river, from the damaging effects on fish and aquatic plants of sediment disruption caused by scavenging activities of certain fish.

Another object of the invention is to provide a solid substrate on which plants and other benthic organisms can reproduce.

Still yet another object of the invention is to incorporate flaps into the mesh netting to allow certain aquatic life access to the bottom of the body of water and to provide an exit mechanism for aquatic organisms beneath the mesh net.

Additional objects, advantages and novel features of the invention will be set forth in the description which follows, and in part will become apparent to those skilled in the art upon examination of the following or may be learned by practice of the invention. The objects and advantages of the invention may be realized and attained by the instrumentalities and combinations particularly pointed out in the appended claims.

SUMMARY OF THE INVENTION

These and other objects of the present invention are accomplished by the utilization of a mesh netting which protects against harmful effects of scavenger fish and provides a substrate on which plants and other benthic organisms can reproduce. The mesh netting apparatus of the present invention comprises a mesh grid netting made of a flexible plastic material having apertures forming flaps at spaced intervals and mesh openings. The apertures are relatively larger than the mesh openings. The mesh netting is preferably one of the following colors: clear, grey, brown, green or camouflage.

BRIEF DESCRIPTION OF THE DRAWINGS

These and other features of the invention will now be described with reference to the drawings of the preferred embodiment which is intended to illustrate and not to limit the invention. In the accompanying drawings that form a part of the specification, the numerals refer to terms and elements of the invention discussed below in the detailed description of the invention:

FIG. 1 is a top view of the invention showing the crescent-shaped apertures aligned so that the apex end of the flaps point downstream.

FIG. 2 is a top view of the invention showing the crescent-shaped apertures having slits removed from the apex end.

DETAILED DESCRIPTION OF THE INVENTION

Figure 3:
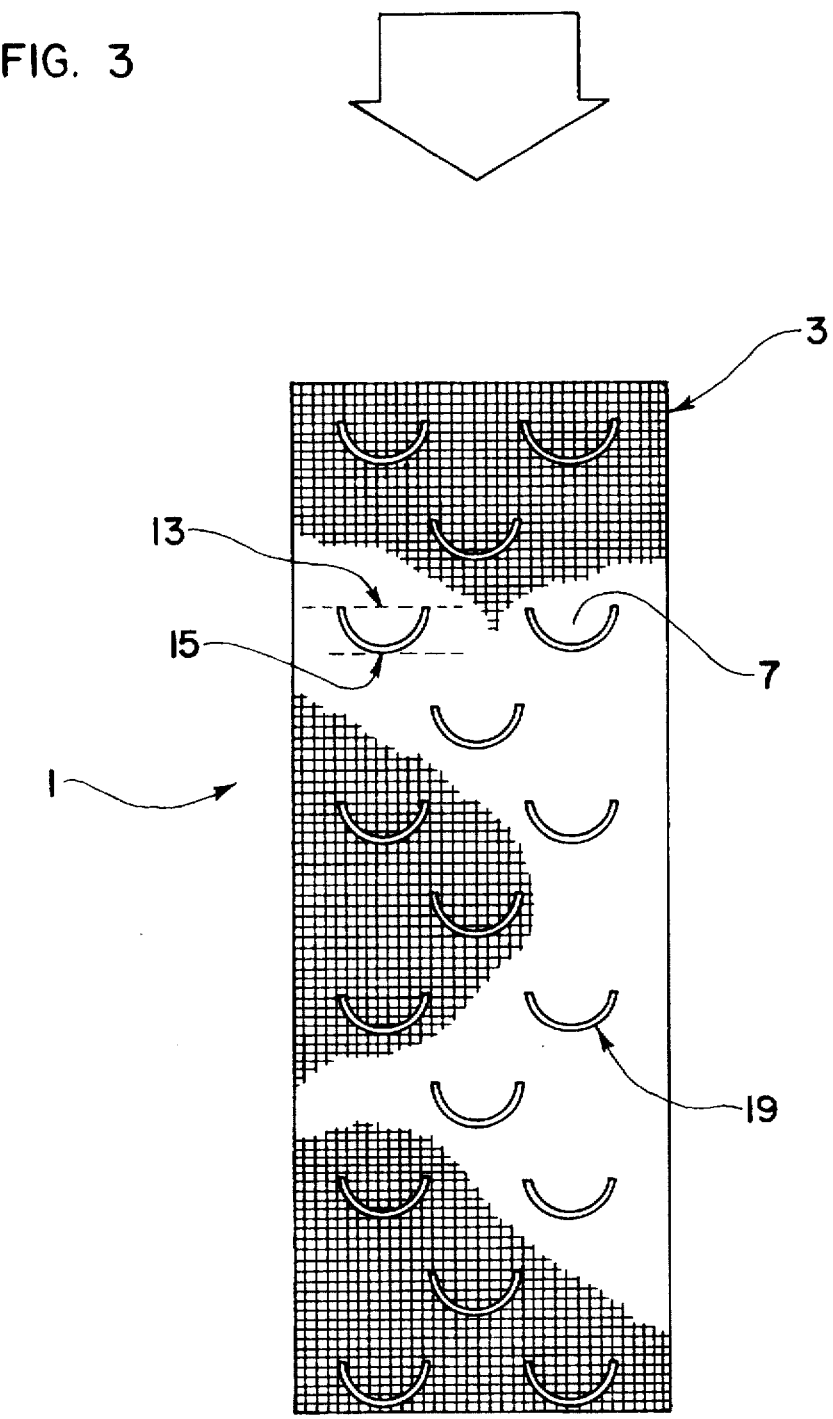
FIG. 3 is a top view of the invention showing the crescent-shaped apertures having slits contiguous to the apertures removed.

Referring now to the drawings, FIGS. 1–3 show a river bottom fish control apparatus 1, which comprises a mesh grid netting 3 with mesh openings 9 and a plurality of apertures 5. The mesh openings 9 allow plants to continue to take root and grow on the bottom of the body of water, such as a river or a lake. The mesh grid netting 3 has a plurality of apertures 5 forming flaps 7, which in the embodiment shown are crescent-shaped, but in other embodiments the apertures may be rectangular, square, oblong or semi-circular, or a combination thereof.

In one embodiment of the invention, the mesh grid netting 3 consists of a woven polyethylene mesh supplied by Amoco Fabrics and Fibers Company, product identification number LX9201. The material is flexible so that the mesh grid netting 3 will conform to the uneven shape of the bottom of the body of water. In this embodiment of the invention, the mesh openings 9 are irregular in shape. The mesh openings have areas of approximately 1/200 to 1/16 square inches. The thickness of this embodiment of the material ranges between 78/1000 and 99/1000 of an inch. Additionally, the woven polyethylene material tears when struck by any hard object so that the mesh grid netting 3. This quality of the fabric is preferable because it inhibits the mesh grid netting from being dragged across the bottom of a body of water for example by a boat anchor coming into contact with the mesh grid netting 3. The mesh grid netting 3 may include any color material, but preferably consists of clear, grey, brown, green or camouflage.

In other embodiments of the invention the mesh grid netting 3 includes mesh openings 9 which are generally square, rectangular or circular in shape. The mesh openings may be between 1/200 and 9 square inches in area.

The mesh grid netting 3 inhibits scavenging fish such as carp from disturbing the silt at the bottom of the body of water, thereby causing increased turbidity as the result of the suspension of solids and sediment in the water. When turbidity is decreased, plant propagules receive more light, which is necessary for plant growth. Furthermore, the mesh grid netting 3 provides a refuge for both benthic organisms and plant propagules, which are often uprooted by the scavenging activities of carp.

The apertures 5 are cut into the mesh grid netting 3 forming flaps 7. The flaps 7 allow the ingress and egress of organisms, such as clams and mollusks, to the bottom of the body of water. The flaps 7 additionally make it much easier to position the mesh grid netting 3 on the bottom of a swift flowing river due to the fact that the mesh grid netting is less resistant to the flow of a river when the flaps are open. This is important when placing the mesh grid netting 3 onto the bottom of the river. The flaps 7 are located at spaced intervals 11, the apertures 5 being relatively larger than the mesh openings 9. In one embodiment, the spaced intervals 11 are approximately twelve inches, however, the spaced intervals may be lesser or greater in other embodiments of the invention. Also, in one embodiment of the invention, the separate rows of flaps 7 are located approximately 6 inches apart.

In one embodiment of the invention, the apertures 5 forming flaps 7 are arranged in rows in which the flaps are aligned in alternating rows similar to fish scales. In another embodiment, the flaps 7 are aligned in both horizontal and vertical rows. The flaps have a hinged end 13 and a apex end 15. The flaps 7 are aligned so that the flap apex ends 15 are pointed in the direction of the flow of the body of water, which keeps the flaps 7 in a normally shut position. Though, the flaps 7 may alternatively be arranged in many different possible ways to achieve the intended results of the invention.

In one embodiment of the invention, the flaps 7 have removed from the apex end 15 a recessed portion 17 (FIG. 2), which allows organisms and plants freer ingress and egress to and from the bottom of the body of water. In an alternative embodiment of the invention, the flaps 7 have removed therefrom a thin strip 19 (FIG. 3) contiguous with the length of the aperture, which allows the flaps 7 to open and close more readily.

I claim:

1. A river bottom fish control apparatus, which comprises a mesh grid netting for providing a substrate for plants and other benthic organism growth and for decreasing turbidity in a body of water, the mesh grid netting comprising a translucent, flexible plastic having mesh openings of between approximately 0.005 to 9 square inches in area, allowing sufficient transmission of light to thereby permit plant growth, the mesh netting having apertures forming flaps permitting ingress and egress of organisms to and from the bottom of the body of water, the flaps being located at spaced intervals, and the apertures being relatively larger than the mesh openings.

2. The river bottom fish control apparatus of claim 1, wherein the apertures forming flaps are crescent-shaped having an apex end and a hinge end.

3. The river bottom fish control apparatus of claim 2, wherein the apertures forming flaps which are approximately twelve-inches across the hinge end of the flap.

4. The river bottom fish control apparatus of claim 3, wherein the apertures form flaps which have a recessed portion removed from the apex end of the flaps.

5. The river bottom fish control apparatus of claim 3, wherein the apertures form flaps which have removed therefrom a thin strip contiguous to the length of the aperture.

6. The river bottom fish control apparatus of claim 3, wherein the apertures form flaps which are arranged in rows spaced approximately six inches apart.

7. The river bottom fish control apparatus of claim 5, wherein the apertures form flaps arranged in alternating rows similar to fish scales.

8. The river bottom fish control apparatus of claim 2, wherein the apertures form flaps aligned so that the apex end of the flap is located at the downward flow of a river bottom.

9. The river bottom fish control apparatus of claim 1, wherein the color of the mesh grid netting is camouflage.

10. The river bottom fish control apparatus of claim 1, wherein the mesh grid netting is approximately three-sixteenths of an inch thick.

11. The river bottom fish control apparatus of claim 1, wherein the mesh grid netting is approximately four feet wide.

12. A river bottom fish control apparatus, which comprises a mesh grid netting for providing a substrate for plant and other benthic organism growth and for decreasing turbidity in a river, the mesh grid netting comprising a flexible plastic netting:

(a) having openings of between approximately 0.01 to 4.5 square inches in area, allowing sufficient transmission of light to thereby permit plant growth, and (b) having crescent-shaped apertures with an apex end and a hinge end to form flaps at spaced intervals permitting ingress and egress of organism to and from the bottom of the body of water, and (c) the apertures being relatively larger than the grid netting openings, and (d) the crescent-shaped apertures being aligned so that the apex end of the flap is located at the downstream flow of the body of water.

13. A river bottom fish control apparatus, which comprises a mesh grid netting for providing a substrate for plant and other benthic organism growth and for decreasing turbidity in a body of water, wherein the mesh grid netting:

(a) is approximately three-sixteenths of an inch thick and four feet wide, and (b) comprises a flexible, woven, translucent, polyethylene fabric, and (c) has openings of between approximately 0.05 to 1 square inches in area, sufficient to allow the transmission of light to thereby permit plant growth, and (d) has crescent-shaped apertures with apex ends and hinge ends forming flaps at spaced intervals, and (e) the apertures being relatively larger than the grid netting openings permitting ingress and egress of organism to and from the bottom of the body of water, and (f) the crescent-shaped apertures being aligned so that the apex end of the flap is located at the downstream flow of the body of water.

14. The river bottom fish control apparatus of claim 13, wherein the apertures form flaps which have removed therefrom a thin strip contiguous to the length of each crescent-shaped aperture.

15. The river bottom fish control apparatus of claim 13, wherein the crescent-shaped apertures form flaps which are arranged in rows, which separate rows are spaced about six inches apart.

16. The river bottom fish control apparatus of claim 15, wherein the crescent-shaped apertures form flaps arranged in rows in which the flaps are aligned in alternating rows offset similar to fish scales.

17. The river bottom fish control apparatus of claim 13, wherein the mesh openings are between about 0.005 and 9.0 square inches in area.

18. The river bottom fish control apparatus of claim 13, wherein the woven polyethylene fabric ranges in thickness between about 0.078 inches and 0.099 inches.

19. The river bottom fish control apparatus of claim 13, wherein the color of the flexible plastic netting is brown.

\* \* \* \* \*